(12) United States Patent
Yamaguchi et al.

(10) Patent No.: US 9,075,676 B2
(45) Date of Patent: Jul. 7, 2015

(54) INFORMATION PROCESSING SYSTEM, INFORMATION PROCESSING METHOD, AND DEVICE AND PROGRAM USED FOR THE INFORMATION PROCESSING SYSTEM AND THE INFORMATION PROCESSING METHOD

(75) Inventors: Tomoharu Yamaguchi, Minato-ku (JP); Mie Noda, Minato-ku (JP); Yuichi Nino, Minato-ku (JP)

(73) Assignees: NEC CORPORATION, Tokyo (JP); NEC Communication Systems Ltd., Tokyo (JP)

( * ) Notice: Subject to any disclaimer, the term of this patent is extended or adjusted under 35 U.S.C. 154(b) by 883 days.

(21) Appl. No.: 12/300,433

(22) PCT Filed: May 11, 2007

(86) PCT No.: PCT/JP2007/059701
§ 371 (c)(1),
(2), (4) Date: Nov. 11, 2008

(87) PCT Pub. No.: WO2007/132748
PCT Pub. Date: Nov. 22, 2007

(65) Prior Publication Data
US 2009/0150889 A1 Jun. 11, 2009

(30) Foreign Application Priority Data
May 12, 2006 (JP) .................. 2006-133755

(51) Int. Cl.
*G06F 9/46* (2006.01)
*G06F 9/445* (2006.01)

(52) U.S. Cl.
CPC .......................... *G06F 8/60* (2013.01)

(58) Field of Classification Search
None
See application file for complete search history.

(56) References Cited

U.S. PATENT DOCUMENTS

| 2003/0110320 A1* | 6/2003 | Ono et al. ................ 710/1 |
| 2005/0054290 A1* | 3/2005 | Logan et al. ............. 455/41.2 |
| 2005/0138647 A1 | 6/2005 | Bou-ghannam et al. |

(Continued)

FOREIGN PATENT DOCUMENTS

| EP | 0910015 A1 | 4/1999 |
| JP | 06309515 A | 11/1994 |

(Continued)

OTHER PUBLICATIONS

Communication dated Nov. 30, 2011 from the Japanese Patent Office in counterpart Japanese application No. 2008-515522.

(Continued)

*Primary Examiner* — Sisley Kim
(74) *Attorney, Agent, or Firm* — Sughrue Mion, PLLC

(57) ABSTRACT

An information processing terminal is provided with a data acquiring means for reading data from an external recording medium; a program storing means for storing a plurality of application programs; a program executing means for executing the stored application programs; and a program selecting means for selecting the application program to be executed by the program executing means. The program selecting means selects the application program to be executed from the programs stored in the program storing means, corresponding to the data acquired through the data acquiring means, and processes the data acquired through the data acquiring means by the application program selected by the program selecting means.

22 Claims, 12 Drawing Sheets

(56) References Cited

U.S. PATENT DOCUMENTS

2005/0139674 A1* 6/2005 Ishibashi et al. .............. 235/454
2007/0229264 A1* 10/2007 Eveland .................... 340/572.1

FOREIGN PATENT DOCUMENTS

| JP | 09-237172 A | 9/1997 |
|---|---|---|
| JP | 10-124623 A | 5/1998 |
| JP | 2000-222537 A | 8/2000 |
| JP | 2001-166927 A | 6/2001 |
| JP | 200291840 A | 3/2002 |
| JP | 2002175187 A | 6/2002 |
| JP | 2002-279371 A | 9/2002 |
| JP | 2002-304314 A | 10/2002 |
| JP | 2002-368954 A | 12/2002 |
| JP | 2003-44801 A | 2/2003 |
| JP | 2003-76958 A | 3/2003 |
| JP | 200376958 A | 3/2003 |
| JP | 2003178273 A | 6/2003 |
| JP | 3458394 B2 | 8/2003 |
| JP | 2004-265174 A | 9/2004 |
| JP | 2004-348617 A | 12/2004 |
| JP | 3651322 B2 | 3/2005 |
| JP | 2005191638 A | 7/2005 |
| JP | 2006072890 A | 3/2006 |
| JP | 2006-513467 A | 4/2006 |
| WO | 2005104558 A1 | 11/2005 |

OTHER PUBLICATIONS

Japanese Office Action dated Mar. 14, 2012 issued by the Japanese Patent Office in corresponding Japanese Application No. 2008-515522.

Office Action dated Aug. 21, 2013, issued by the Japanese Patent Office in corresponding Japanese application No. 2012-110270.

Office Action dated Mar. 27, 2013 issued by the Japanese Patent Office in corresponding Japanese Patent Application No. 2012-110270.

* cited by examiner

Discount Coupon

Shop-1

500 yen

FIG. 10

T:My Device ¥ Program Files ¥ Shop1Appli,
D:DiscountCoupon(500,JPY)
A:activate 531   521   511

FIG. 11

| "Gc" | Config Byte | "target" | Target Identifier | | "action" | Action Flag Byte | Action Identifier | | "data" | Data | |
|---|---|---|---|---|---|---|---|---|---|---|---|
| | | | TypeName | Payload | | | TypeName | Payload | | TypeName | Payload |
| TypeName | Payload | | | | | | | | | | |

FIG. 12

| Offset | Content | Length | Explanation |
|---|---|---|---|
| 0 | 0xD1 | 1 | record header. TNF=0x01 (Well Known Type), SR=1, MB=1, ME=1 |
| 1 | 0x02 | 1 | Record Name Length |
| 2 | 0x3F | 1 | Length of the Control data (63Bytes) |
| 3 | "Gc" | 2 | The record name |
| 5 | 0x11 | 1 | Configuration Byte SN=1, SC=0, EC=0, PL=0x1 |
| 6 | 0xD1 | 1 | record header. TNF=0x00, SR=1, MB=1, ME=1 |
| 7 | 0x01 | 1 | Record Name Length |
| 8 | 0x22 | 1 | Length of the Target data (34 Bytes) |
| 9 | "t" | 1 | The record name of Target in short form |
| 10 | 0xD1 | 1 | record header. TNF=0x01, SR=1, MB=1, ME=1 |
| 11 | 0x01 | 1 | Record Name Length |
| 12 | 0x1E | 1 | Length of the Target data (30 Bytes) |
| 13 | "U" | 1 | The record name |
| 14 | 0x00 | 1 | URI identifier code (N/A=0x00) |
| 15 | "localhost://App/CustomerBonus" | 29 | Value of Target |
| 44 | 0xD1 | 1 | record header. TNF=0x01, SR=1, MB=1, ME=1 |
| 45 | 0x01 | 1 | Record Name Length |
| 46 | 0x07 | 1 | Length of the Target data |
| 47 | "a" | 1 | The record name of Action in short form |
| 48 | 0x00 | 1 | Action Flag NC=0 (text name) |
| 49 | 0xD1 | 1 | record header. TNF=0x01, SR=1, MB=1, ME=1 |
| 50 | 0x01 | 1 | Record Name Length |
| 51 | 0x03 | 1 | Length of the Target data (5 Bytes) |
| 52 | "T" | 1 | The record name |
| 53 | 0x05 | 1 | Status Byte |
| 54 | "en-US" | 1 | Language Code |
| 55 | "add" | 3 | Value of Action |
| 56 | 0xD1 | 1 | record header. TNF=0x01, SR=1, MB=1, ME=1 |
| 57 | 0x01 | 1 | Record Name Length |
| 58 | 0x07 | 1 | Length of the Target data |
| 59 | "d" | 1 | The record name of Data in short form |
| 60 | 0xD1 | 1 | record header. TNF=0x01, SR=1, MB=1, ME=1 |
| 61 | 0x01 | 1 | Record Name Length |
| 62 | 0x03 | 1 | Length of the Target data (5 Bytes) |
| 63 | "T" | 1 | The record name |
| 64 | 0x05 | 1 | Status Byte |
| 65 | "en-US" | 1 | Language Code |
| 66 | "500" | 3 | Value of Data |

FIG. 13

| Offset | Content | Length | Explanation |
|---|---|---|---|
| 0 | 0xD1 | 1 | record header. TNF=0x01 (Well Known Type), SR=1, MB=1, ME=1 |
| 1 | 0x02 | 1 | Record Name Length |
| 2 | 0x42 | 1 | Length of the Control data (66 Bytes) |
| 3 | "Gc" | 2 | The record name |
| 5 | 0x01 | 1 | Configuration Byte SN=1, SC=0, EC=0, PL=0x0 |
| 6 | 0xD1 | 1 | record header. TNF=0x00, SR=1, MB=1, ME=1 |
| 7 | 0x01 | 1 | Record Name Length |
| 8 | 0x22 | 1 | Length of the Target data (34 Bytes) |
| 9 | "t" | 1 | The record name of Target in short form |
| 10 | 0xD1 | 1 | record header. TNF=0x01, SR=1, MB=1, ME=1 |
| 11 | 0x01 | 1 | Record Name Length |
| 12 | 0x0F | 1 | Length of the Target data (17 Bytes) |
| 13 | "T" | 1 | The record name |
| 14 | 0x05 | 1 | Status Byte |
| 15 | "en-US" | 1 | Language Code |
| 16 | "PropertyManager" | 15 | Value of Target |
| 31 | 0xD1 | 1 | record header. TNF=0x01, SR=1, MB=1, ME=1 |
| 32 | 0x01 | 1 | Record Name Length |
| 33 | 0x07 | 1 | Length of the Target data |
| 34 | "a" | 1 | The record name of Action in short form |
| 35 | 0x00 | 1 | Action Flag NC=0 (text name) |
| 36 | 0xD1 | 1 | record header. TNF=0x01, SR=1, MB=1, ME=1 |
| 37 | 0x01 | 1 | Record Name Length |
| 38 | 0x03 | 1 | Length of the Target data (5 Bytes) |
| 39 | "T" | 1 | The record name |
| 40 | 0x05 | 1 | Status Byte |
| 41 | "en-US" | 1 | Language Code |
| 42 | "Set" | 3 | Value of Action |
| 45 | 0xD1 | 1 | record header. TNF=0x01, SR=1, MB=1, ME=1 |
| 46 | 0x01 | 1 | Record Name Length |
| 47 | 0x07 | 1 | Length of the Target data |
| 48 | "d" | 1 | The record name of Data in short form |
| 49 | 0xD1 | 1 | record header. TNF=0x01, SR=1, MB=1, ME=1 |
| 50 | 0x01 | 1 | Record Name Length |
| 51 | 0x03 | 1 | Length of the Target data (12 Bytes) |
| 52 | "T" | 1 | The record name |
| 53 | 0x05 | 1 | Status Byte |
| 54 | "en-US" | 1 | Language Code |
| 55 | "SilentMode" | 10 | Value of Data |
| 65 | 0xD1 | 1 | record header. TNF=0x01, SR=1, MB=1, ME=1 |
| 66 | 0x01 | 1 | Record Name Length |
| 67 | 0x02 | 1 | Length of the Target data (4 Bytes) |
| 68 | "T" | 1 | The record name |
| 69 | 0x05 | 1 | Status Byte |
| 70 | "en-US" | 1 | Language Code |
| 71 | "ON" | 2 | Value of Data |

FIG. 14

| Offset | Content | Length | Explanation |
|---|---|---|---|
| 0 | 0xD1 | 1 | record header. TNF=0x01 (Well Known Type), SR=1, MB=1, ME=1 |
| 1 | 0x02 | 1 | Record Name Length |
| 2 | 0x42 | 1 | Length of the Control data (66 Bytes) |
| 3 | "Gc" | 2 | The record name |
| 5 | 0x07 | 1 | Configuration Byte SN=1, SC=1, EC=1, PL=0x0 |
| 6 | 0xD1 | 1 | record header. TNF=0x00, SR=1, MB=1, ME=1 |
| 7 | 0x01 | 1 | Record Name Length |
| 8 | 0x22 | 1 | Length of the Target data (34 Bytes) |
| 9 | "t" | 1 | The record name of Target in short form |
| 10 | 0xD1 | 1 | record header. TNF=0x01, SR=1, MB=1, ME=1 |
| 11 | 0x01 | 1 | Record Name Length |
| 12 | 0x11 | 1 | Length of the Target data (17 Bytes) |
| 13 | "T" | 1 | The record name |
| 14 | 0x05 | 1 | Status Byte |
| 15 | "en-US" | 1 | Language Code |
| 16 | "PropertyManager" | 15 | Value of Target |
| 31 | 0xD1 | 1 | record header. TNF=0x01, SR=1, MB=1, ME=1 |
| 32 | 0x01 | 1 | Record Name Length |
| 33 | 0x07 | 1 | Length of the Target data |
| 34 | "a" | 1 | The record name of Action in short form |
| 35 | 0x00 | 1 | Action Flag NC=0 (text name) |
| 36 | 0xD1 | 1 | record header. TNF=0x01, SR=1, MB=1, ME=1 |
| 37 | 0x01 | 1 | Record Name Length |
| 38 | 0x05 | 1 | Length of the Target data (5 Bytes) |
| 39 | "T" | 1 | The record name |
| 40 | 0x05 | 1 | Status Byte |
| 41 | "en-US" | 1 | Language Code |
| 42 | "Set" | 3 | Value of Action |
| 45 | 0xD1 | 1 | record header. TNF=0x01, SR=1, MB=1, ME=1 |
| 46 | 0x01 | 1 | Record Name Length |
| 47 | 0x07 | 1 | Length of the Target data |
| 48 | "d" | 1 | The record name of Data in short form |
| 49 | 0xD1 | 1 | record header. TNF=0x01, SR=1, MB=1, ME=1 |
| 50 | 0x01 | 1 | Record Name Length |
| 51 | 0x0C | 1 | Length of the Target data (12 Bytes) |
| 52 | "T" | 1 | The record name |
| 53 | 0x05 | 1 | Status Byte |
| 54 | "en-US" | 1 | Language Code |
| 55 | "SilentMode" | 10 | Value of Data |
| 65 | 0xD1 | 1 | record header. TNF=0x01, SR=1, MB=1, ME=1 |
| 66 | 0x01 | 1 | Record Name Length |
| 67 | 0x05 | 1 | Length of the Target data (5 Bytes) |
| 68 | "T" | 1 | The record name |
| 69 | 0x05 | 1 | Status Byte |
| 70 | "en-US" | 1 | Language Code |
| 71 | "OFF" | 3 | Value of Data |
| 74 | 0xD1 | 1 | record header. TNF=0x01 (Well Known Type), SR=1, MB=1, ME=1 |
| 75 | 0x02 | 1 | Record Name Length |
| 76 | 0x3F | 1 | Length of the Control data (63 Bytes) |
| 77 | "Gc" | 2 | The record name |
| 79 | 0x01 | 1 | Configuration Byte SN=1, SC=0, EC=0, PL=0x0 |
| 80 | 0xD1 | 1 | record header. TNF=0x00, SR=1, MB=1, ME=1 |
| 81 | 0x01 | 1 | Record Name Length |
| 82 | 0x22 | 1 | Length of the Target data (34 Bytes) |
| 83 | "t" | 1 | The record name of Target in short form |
| 84 | 0xD1 | 1 | record header. TNF=0x01, SR=1, MB=1, ME=1 |
| 85 | 0x01 | 1 | Record Name Length |
| 86 | 0x1C | 1 | Length of the Target data (28 Bytes) |
| 87 | "U" | 1 | The record name |
| 88 | 0x00 | 1 | URI identifier code (N/A=0x00) |
| 89 | "localhost//App/MusicPlayer" | 27 | Value of Target |
| 116 | 0xD1 | 1 | record header. TNF=0x01, SR=1, MB=1, ME=1 |
| 117 | 0x01 | 1 | Record Name Length |
| 118 | 0x0B | 1 | Length of the Target data |
| 119 | "a" | 1 | The record name of Action in short form |
| 120 | 0x00 | 1 | Action Flag NC=0 (text name) |
| 121 | 0xD1 | 1 | record header. TNF=0x01, SR=1, MB=1, ME=1 |
| 122 | 0x01 | 1 | Record Name Length |
| 123 | 0x06 | 1 | Length of the Target data (6 Bytes) |
| 124 | "T" | 1 | The record name |
| 125 | 0x05 | 1 | Status Byte |
| 126 | "en-US" | 1 | Language Code |
| 127 | "play" | 4 | Value of Action |
| 131 | 0xD1 | 1 | record header. TNF=0x01, SR=1, MB=1, ME=1 |
| 132 | 0x01 | 1 | Record Name Length |
| 133 | 0x14 | 1 | Length of the Target data |
| 134 | "d" | 1 | The record name of Data in short form |
| 135 | 0xD1 | 1 | record header. TNF=0x01, SR=1, MB=1, ME=1 |
| 136 | 0x01 | 1 | Record Name Length |
| 137 | 0x10 | 1 | Length of the Target data (16 Bytes) |
| 138 | "U" | 1 | The record name |
| 139 | 0x03 | 1 | URI identifier code ("http://") |
| 140 | "NECMusic.jp/top" | 15 | Value of Data |

INFORMATION PROCESSING SYSTEM, INFORMATION PROCESSING METHOD, AND DEVICE AND PROGRAM USED FOR THE INFORMATION PROCESSING SYSTEM AND THE INFORMATION PROCESSING METHOD

TECHNICAL FIELD

The present invention relates to an information processing system, an information processing method, and an apparatus and a program for use in the same, and particularly to a technique for, when reading information stored in an external recording medium and processing it by an application program, selecting an appropriate application program from a plurality of stored application programs for execution.

BACKGROUND ART

Patent Document 1 discloses a communication terminal for wireless communication with a base station, wherein the communication terminal acquires information for locating the terminal from the base station, looks up activation information that is retained in the terminal beforehand and that describes correspondence between the position information and a subroutine, and determines a subroutine to be activated depending upon the position information.

Patent Document 2 discloses a program downloading system for reading data stored in a non-contacted IC tag, and switching the mode of an application program between downloading and activation.

Patent Document 3 discloses a service providing terminal for providing a service to a user, with which a service ID and a terminal ID are stored into a card, the user keeps the card, and a service program is executed using the service ID and terminal ID on the card.

Patent Document 4 discloses a technique for storing target data into a card-type storage medium, reading the target data by a terminal, and determining application software for processing the target data by application software selecting/control means in the terminal.

It is also a common practice for a conventional operating system to look up an extension appended to the filename of a data file and correspondence between an extension and a program registered in the operating system, and activating a corresponding specific application program for processing a data file having a specific extension.

Patent Document 1: Japanese Patent No. 3458394, page 1, line 1, FIG. 1
Patent Document 2: Japanese Patent No. 003651322, page 1, line 1, FIG. 1
Patent Document 3: JP-P2000-222537A
Patent Document 4: JP-P2001-166927A

DISCLOSURE OF THE INVENTION

Problems to be Solved by the Invention

A first problem is that when a plurality of application programs capable of processing target data are found in a terminal that a user has and there indeed exists a more appropriate application program, the data cannot be processed by an application program other than a predetermined one.

Also in the technique disclosed in Patent Document 1, predefined activation information on correspondence between position information and a subroutine is kept, and therefore, a different subroutine cannot be activated at the same position.

In the technique disclosed in Patent Document 2, only one application program can be downloaded or activated, and the technique also does not allow a more appropriate application program to be selected.

This is because correspondence between the type of target data and an application program is inflexible and therefore the target data is always passed to a predetermined application program for processing.

In the technique disclosed in Patent Document 3, a user keeps a card in which a service ID and a terminal ID are stored, and a service providing terminal for providing a service is fixed; in the first place, the concept that an appropriate application program is selected at a terminal kept by a user is not conceived.

A second problem is that target data may not always be processed as intended by a creator of the target data because the creator of the target data cannot specify execution-conditions for an application program at discretion.

This is because, as in the conventional operating system or as in the technique disclosed in Patent Document 4, correspondence between target data and an application program is predetermined by an information processing apparatus that executes the application program.

The present invention has been made considering such problems, and its object is to provide an information processing technique that improves operability by selecting for execution an appropriate application program from a plurality of application programs based on information stored in an external recording medium.

Another object of the present invention is to provide a technique for an information processing apparatus comprising a plurality of application programs, which technique improves reliability of the information processing apparatus and maintainability of data kept in a recording medium by storing in a recording medium execution-conditions for an application program for processing target data recorded in a recording medium along with the target data.

Still another object of the present invention is to provide an information processing technique that improves flexibility of correspondence between target data and an application by storing in a recording medium execution-conditions for an application program for processing the target data along with target data.

Means to Solve the Problem

The present invention for solving the above-mentioned problems, which is an information processing system characterized in that the system comprises: a recording medium having an execution-condition recording region for recording execution-conditions for an application program; and an information processing terminal including acquiring means for acquiring the execution-conditions for said application program from said recording medium, application program selecting means for selecting an application program suited to the execution-conditions for the application program acquired by said acquiring means, and application program executing means for executing the application program selected by said application program selecting means.

The present invention for solving the above-mentioned problems, which is an information processing method characterized in that: execution-conditions for an application program are recorded on a recording medium; an information processing terminal acquires the execution-conditions for said application program from said recording medium; said information processing terminal selects an application program suited to said acquired execution-conditions for the application program; and said information processing terminal executes said selected application program.

The present invention for solving the above-mentioned problems, which is an information processing terminal characterized in that the terminal comprises: acquiring means for acquiring, from a recording medium recorded with execution-conditions for an application program, the execution-conditions for said application program; application program selecting means for selecting an application program suited to the execution-conditions for the application program acquired by said acquiring means; and application program executing means for executing the application program selected by said application program selecting means.

The present invention for solving the above-mentioned problems, which is an information processing terminal characterized in that the terminal comprises: acquiring means for acquiring, from a recording medium recorded with data and execution-conditions for an application program for processing said data, said data and the execution-conditions for said application program; application program selecting means for selecting an application program suited to the execution-conditions for the application program acquired by said acquiring means; and application program executing means for processing the data acquired by said acquiring means by means of the application program selected by said application program selecting means.

The present invention for solving the above-mentioned problems, which is a program for an information processing terminal, characterized in that the program causes said information processing terminal to execute the processing of: acquiring, from a recording medium recorded with execution-conditions for an application program, the execution-conditions for said application program; selecting an application program suited to said acquired execution-conditions for the application program; and executing said selected application program.

The present invention for solving the above-mentioned problems, which is a program for an information processing terminal, characterized in that the program causes said information processing terminal to execute the processing of: acquiring, from a recording medium recorded with execution-conditions for an application program and data to be processed by said application program, the execution-conditions for said application program and the data; selecting an application program suited to said acquired execution-conditions for the application program; and processing said acquired data by said selected application program.

The present invention for solving the above-mentioned problems, which is a recording medium, characterized in that the medium comprises: an execution-condition recording region in which execution-conditions for an application program are recorded; and a data recording region in which data to be processed by said application program is recorded.

The present invention for solving the above-mentioned problems, which is a data loading apparatus for a recording medium, characterized in that the apparatus comprises execution-condition recording means for recording execution-conditions for an application program to be executed in an information processing apparatus into a recording medium.

The present invention for solving the above-mentioned problems, which is a recording medium recorded with a program, characterized in that said program causes said information processing terminal to execute the processing of: acquiring, from a recording medium recorded with execution-conditions for an application program, the execution-conditions for said application program; selecting an application program suited to said acquired execution-conditions for the application program; and executing said selected application program.

The present invention for solving the above-mentioned problems, which is a recording medium recorded with a program, characterized in that said program causes said information processing terminal to execute the processing of: acquiring, from a recording medium recorded with execution-conditions for an application program and data to be processed by said application program, the execution-conditions for said application program and the data; selecting an application program suited to said acquired execution-conditions for the application program; and processing said acquired data by said selected application program.

Effects of the Invention

A first effect of the present invention is that operability of an information processing apparatus is improved by automatically selecting and executing an appropriate application program for processing the target data stored in an external recording medium.

This is because there are provided data acquiring means for acquiring execution-conditions for an application program stored in an external recording medium along with target data; program selecting means for selecting an appropriate one from a plurality of application programs based on the acquired execution-conditions for an application program; and program executing means for executing the selected program to process the target data.

A second effect of the present invention is that a variety of services can be provided for similar types of target data by applying different processing depending upon purposes.

This is because execution-conditions for an application program for processing target data are stored along with the target data in a recording medium, whereby execution-conditions for an application program can be determined depending upon an aim of the creator of the data, thus improving flexibility in correspondence between target data and an application program executed in the information processing apparatus.

BRIEF DESCRIPTION OF THE DRAWINGS

FIG. 9 is a diagram for explaining an Example 7.

FIG. 10 is a diagram for explaining the Example 7.

FIG. 11 is a diagram for explaining an Example 8.

FIG. 12 is a diagram for explaining the Example 8.
FIG. 13 is a diagram for explaining an Example 9.
FIG. 14 is a diagram for explaining an Example 10.

EXPLANATION OF SYMBOLS

Figure 1:
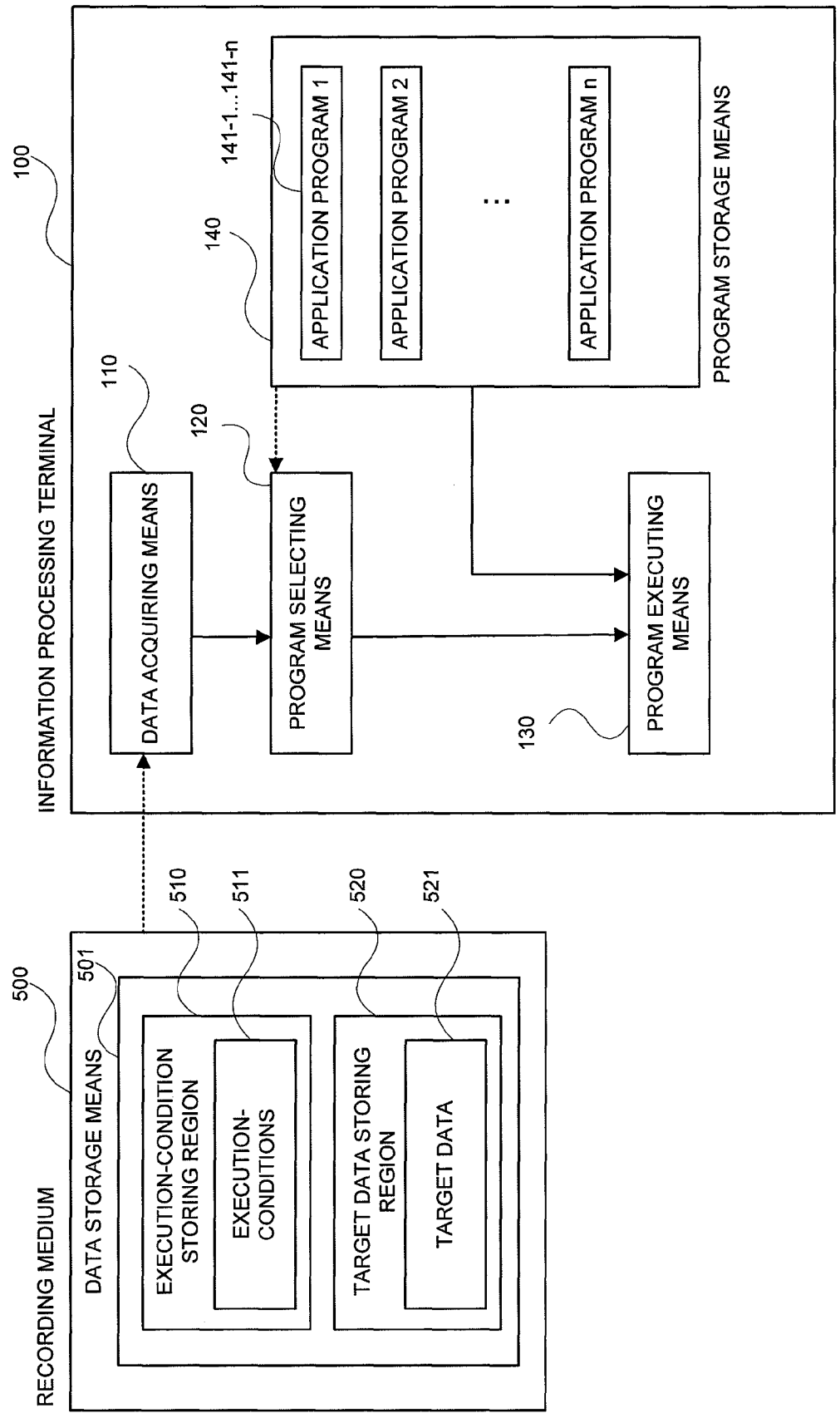
FIG. 1 is a diagram showing a configuration of an information processing system in accordance with an embodiment of the present invention.

100 Information processing terminal
110 Data acquiring means
120 Program selecting means
130 Program executing means
140 Program storage means
141-1-141-n Application programs
142-1-142-n Program profiles
150 Context acquiring means
160 Data retaining means
500 Recording medium
501 Data storage means
510 Execution-condition storing region
511 Execution-condition data
520 Target data storing region
521 Target data
900 Data loading apparatus
910 Target data registering means
920 Execution-condition registering means
930 Data writing means

BEST MODES FOR CARRYING OUT THE INVENTION

Now embodiments of the present invention will be described in detail with reference to the accompanying drawings.

FIG. 1 a diagram showing a configuration of an information processing system in accordance with an embodiment of the present invention. In FIG. 1, reference numeral 100 designates an information processing terminal, and 500 designates a recording medium.

The information processing terminal 100 is a portable terminal such as, for embodiment, a cell phone or a PDA. The information processing terminal 100 includes data acquiring means 110 for reading data from the external recording medium 500; program storage means 140 for storing therein a plurality of application programs 141-1-141-n; program selecting means 120 for selecting an application program to be executed by program executing means 130 from the application programs 141-1-141-n stored in the program storage means 140; and program executing means 130 for executing the application program selected by the program selecting means 120.

The recording medium 500 is, for embodiment, an RFID tag, or one- or two-dimensional bar code printed on paper. The recording medium 500 is comprised of data storage means 501 provided with a target data storing region 520 in which data to be processed by any one of the application programs 141-1-141-n in the information processing terminal 100 is held; and an execution-condition storing region 510 in which execution-conditions for an application program intended to process the data stored in the target data storing region 520 are held.

As used herein, execution-conditions for an application program may include application program identification information for identifying the application program, application program property information for specifying a property of the application program, service quality information for specifying quality of a service provided by the application program, and application program activation condition information for specifying an activation condition for the application program.

The application program identification information refers to identification information for identifying (designating) an application program to be executed by the program executing means 130, and includes, for embodiment, the name of the application program.

The application program property information refers to information for specifying a property of an application program to be executed by the program executing means 130, and includes, for example, specification of the application program required to process data.

The service quality information refers to service quality information for specifying quality of a service provided by an application program, and includes, for example, the charge and scope of the service provided by the application program, and the communication speed and quality when the service is communication or the like.

The activation condition refers to an activation condition for an application program as activated by the program executing means 130, and includes, for example, an activation condition that the application program is to be activated only when the information processing terminal 100 is located at a certain position, and an activation condition that the application program is to be activated when a given time is reached.

Figure 2:
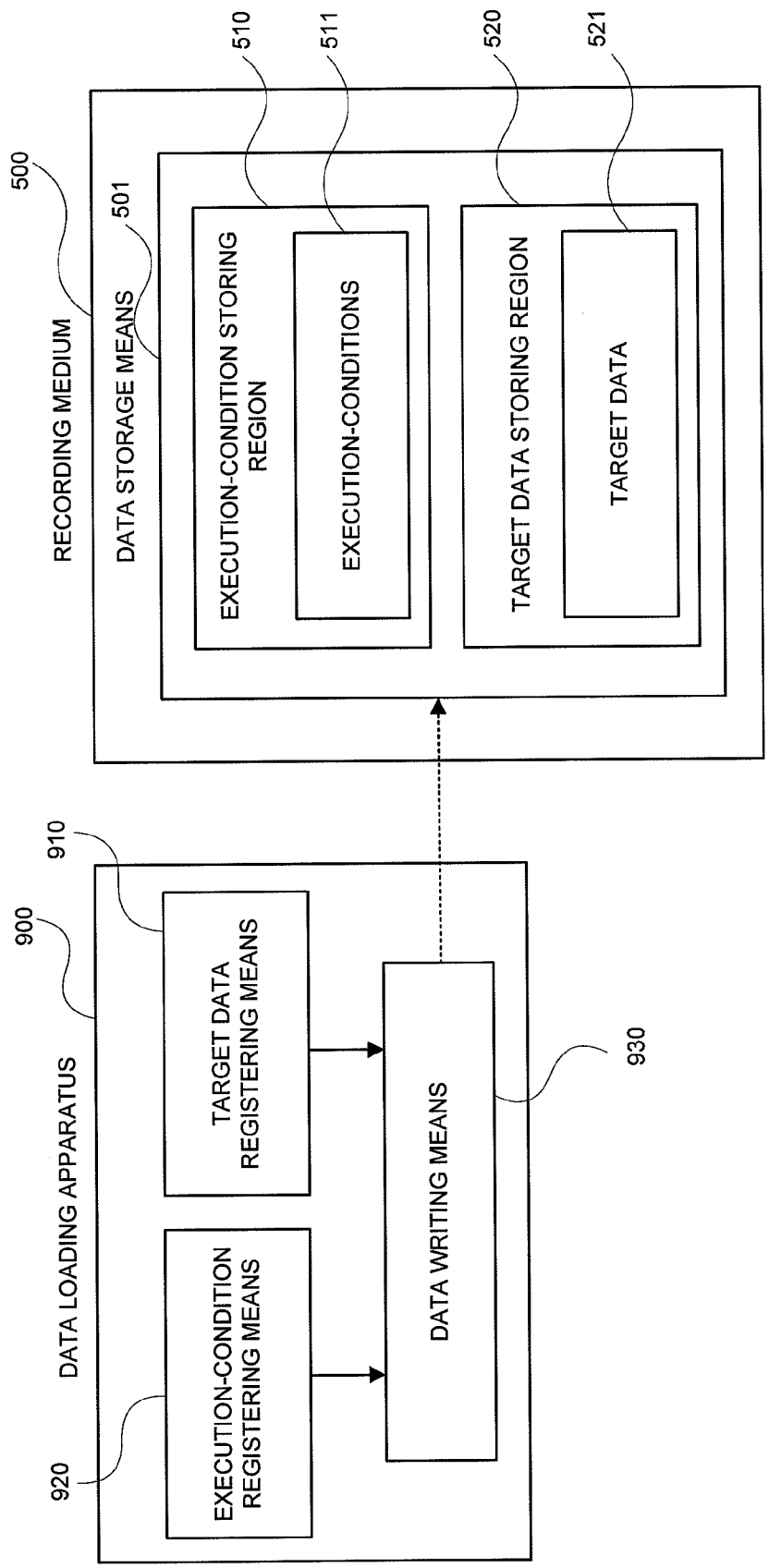
FIG. 2 is a diagram showing a configuration of a data loading apparatus 900 of the present invention.

FIG. 2 shows a configuration of a data loading apparatus 900 of the present invention.

The data loading apparatus 900 for loading data to be held in the recording medium 500 includes target data registering means 910 for registering target data 521, execution-condition registering means 920 for registering execution-conditions 511 for an application program for processing the target data 521, and data writing means 930 for writing the target data 521 and execution-conditions 511 into the data storage means 501 in the recording medium 500.

The target data registering means 910 and execution-condition registering means 920 in the data loading apparatus 900 may be configured as GUI (graphical user interface) or CUI (command interface) for a data creator, or API (application program interface) used by a different program.

Next, an operation in the aforementioned configuration will be described.

Figure 3:
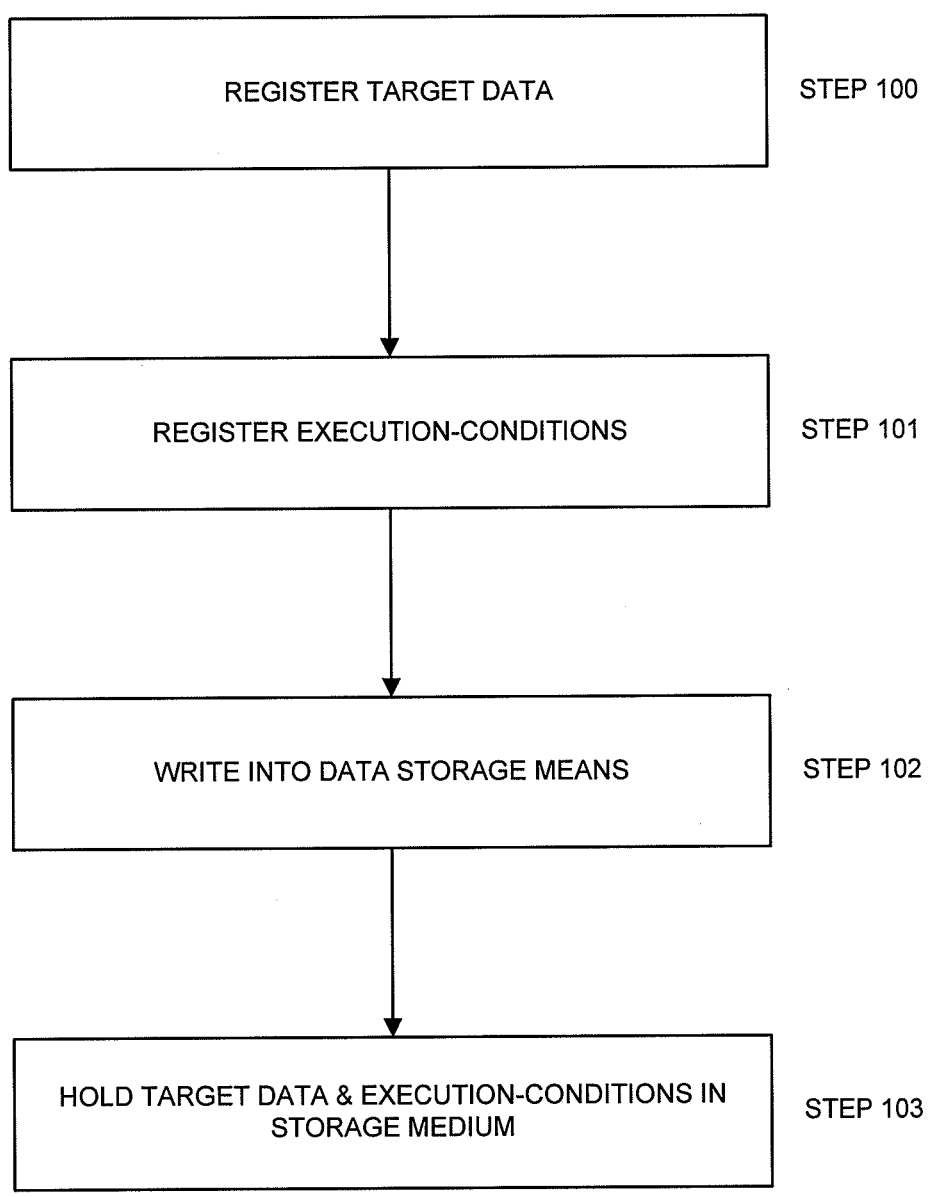
FIG. 3 is a flow chart for the data loading apparatus 900 in accordance with an embodiment of the present invention.

First, an operation of the data loading apparatus 900 will be described. FIG. 3 is a flow chart for the data loading apparatus 900 in accordance with an embodiment of the present invention.

The data loading apparatus 900 accepts registration of the target data 521 from the target data registering means 910 (Step 100), and also accepts registration of the execution-conditions 511 for an application program for processing the target data 521 from the execution-condition registering means 920 (Step 101).

Subsequently, the data writing means 930 receives the target data 521 from the target data registering means 910 and the execution-conditions 511 from the execution-condition registering means 920, and writes them into the data storage means 501 in the recording medium 500 (Step 102).

The recording medium 500 holds the target data 521 and execution-conditions 511 written by the data loading apparatus 900 into the data storage means 501 (Step 103).

It should be noted that the sequence of the registration and writing of the target data 521 and those of execution-conditions 511 is not limited to that as described above and may be inverted.

Figure 4:
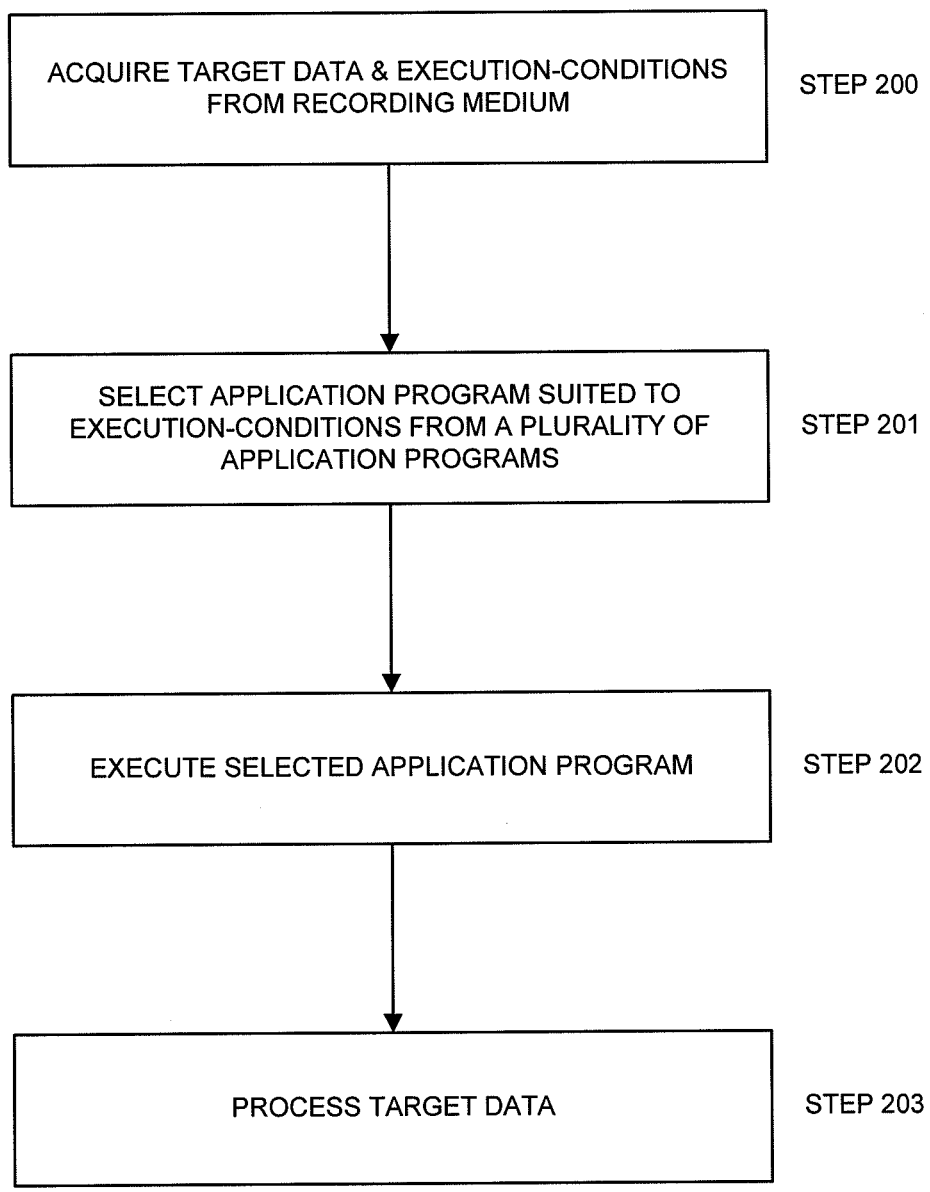
FIG. 4 is a flow chart for an information processing terminal 100 in accordance with an embodiment of the present invention.

An operation of the information processing terminal 100 will be subsequently described. FIG. 4 is a flow chart for the information processing terminal 100 in accordance with an embodiment of the present invention.

The information processing terminal 100 uses the data acquiring means 110 to read from the external recording medium 500 the target data 521 and execution-conditions 511 stored in the data storage means 501 (Step 200).

The program selecting means 120 selects an application program suited to execution-conditions for an application program described in the execution-conditions 511 acquired via the data acquiring means 110 from the plurality of application programs stored in the program storage means 140 (Step 201).

The program executing means 130 executes the application program selected by the program selecting means 120 (Step 202), and processes the target data 521 acquired via the data acquiring means 110 (Step 203).

Now another embodiment of the present invention will be described.

The aforementioned embodiment describes a case in which the target data 521 and execution-conditions 511 are held in the recording medium 500, the information processing terminal 100 reads the target data 521 and execution-conditions 511, and the read target data 521 is processed by an application program suited to the execution-conditions 511.

However, an application program intended to be executed under the execution-conditions 511 may sometimes require no target data 521, and in such a case, the recording medium 500 need not contain the target data 521. In this case, the data storage means 501 may be configured to contain no target data storing region 502, or may contain a target data storing region 520 that holds no valid target data 512.

Likewise, in a case that no special conditions for an application program need be specified as an application program intended for processing the target data 512, the recording medium 500 may be configured to contain no execution-condition storing region 510, or may contain an execution-condition storing region 510 that holds no execution-conditions 511 as valid conditions for an application program.

Moreover, the target data storing region 520 and execution-condition storing region 510 contained in the data storage means 501 may be dynamically allocated in a variable size to the data storage means 501 in the form so as to allow loading by the data loading apparatus 900 and reading by the information processing apparatus 100.

Example 1

Now an Example 1 will be described.

The Example 1 describes a case in which the recording medium 500 is an RFID tag, the information processing terminal 100 is a cell phone, and the data acquiring means 110 is an RFID tag reader.

The RFID tag and reader employed are those in conformity with ISO 14443 standard. Exemplary application programs include a first application program distributed by a first dealer for making a coupon including electronic cash redeemable, and a second application program distributed by a second dealer for making a flier including another type of electronic cash redeemable, which applications are assumed to be held in the cell phone in the program storage means 140.

On the other hand, it is assumed that the first RFID tag serving as the recording medium 500 is registered with electronic cash as the target data 521, and the program execution-conditions 511 represent the name of the first application program distributed by the first dealer. The first RFID tag is attached to the coupon. It is also assumed that the second RFID tag serving as the recording medium is registered with electronic cash as the target data 521, and the program execution-conditions 511 represent the name of the second application program distributed by the second dealer. The second RFID tag is attached to the flier.

Once the first RFID tag attached to the coupon is read by the RFID tag reader in the cell phone, the program selecting means 120 selects a first application program based on the read name of the first application program. The program executing means 130 then activates the first application program for processing the coupon to make electronic cash recorded as the target data redeemable.

Similarly, once the second RFID tag attached to the flier is read by the RFID tag reader in the same cell phone, the program selecting means 120 selects a second application program based on the read name of the second application program. The program executing means 130 then activates the second application program for processing the flier to make electronic cash redeemable.

It should be noted that another electronically readable medium, such as an IC card, may be employed in place of the RFID tag.

Moreover, in the example described above, a condition may be set such that electronic cash should be made redeemable only when a purchase at a specific price or higher is determined via the first and second application programs. In this case, the decision condition that a purchase at a specific price or higher should be made may be incorporated in the application program itself or written into the data. Based on the decision condition, the application program decides whether a purchase at a specific price or higher is made, and executes processing of making electronic cash redeemable if the condition is satisfied.

By using the information processing apparatus and recording medium of the present invention as in this example, different application programs can be executed for the same type of target data, which is electronic cash here, thus allowing a variety of services to be provided by performing different types of processing on the target data according to purposes.

Example 2

Now an Example 2 will be described.

Similarly to the Example 1, the Example 2 illustrates a cell phone, which includes a reader for an RFID tag as the data acquiring means 110, stores therein a plurality of application programs, and is capable of executing them. The description will be made with differences from the Example 1 in that the execution-conditions include, in addition to the name of a program to be executed, an activation condition for the program, and the program selecting means 120 checks the activation condition to decide validity of activation of a program.

Figure 5:
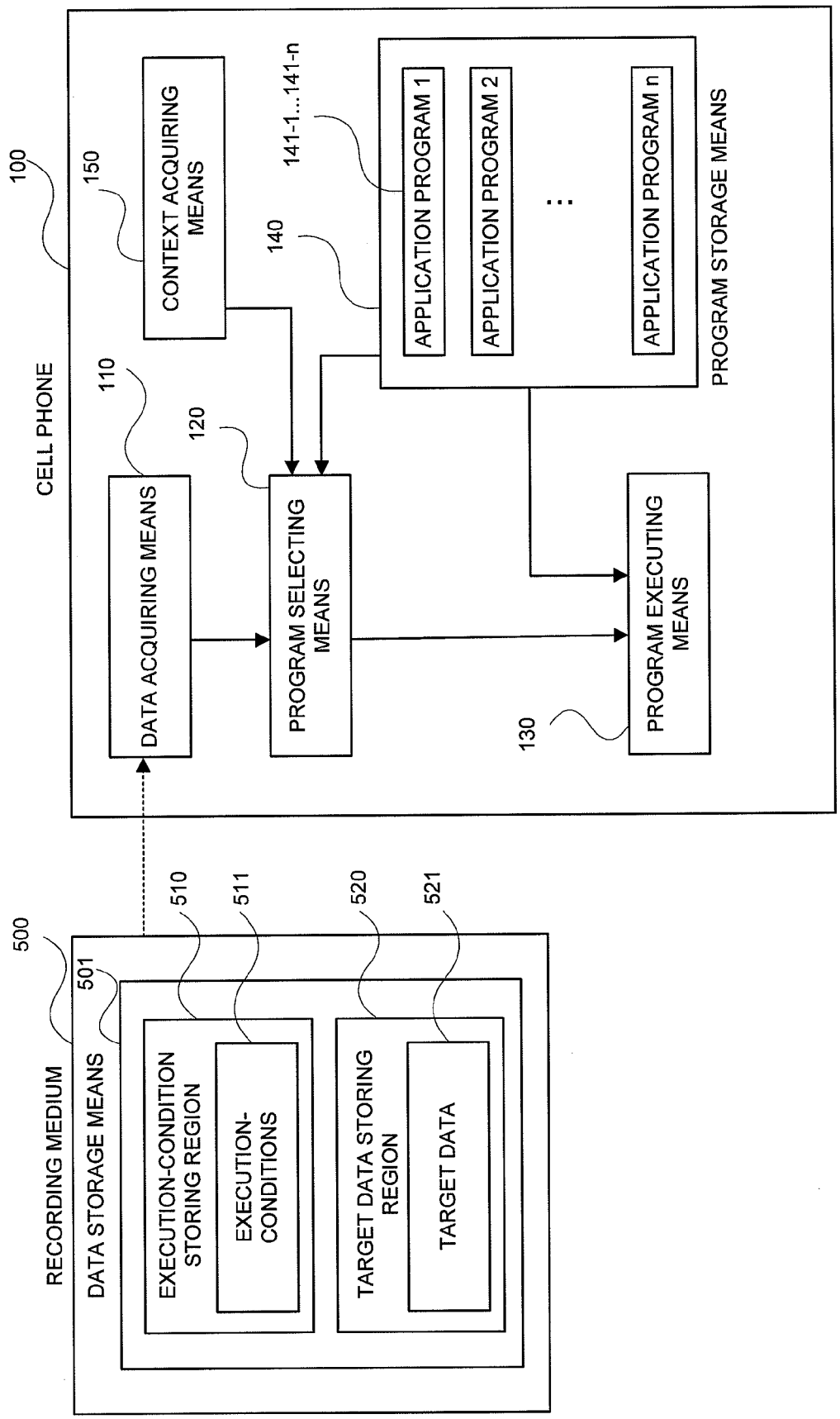
FIG. 5 is a diagram showing a configuration of an Example 2.

The cell phone further includes context acquiring means 150, as shown in FIG. 5. The context acquiring means 150 employed is, for example, a GPS (Global Positioning System) apparatus for determining the current position of the cell phone. Moreover, the execution-conditions in the RFID tag serving as the recording medium 500 include description of a geographical extent for activation (activation condition), in addition to the name of the program.

After the cell phone has read an RFID tag, the program selecting means 120 compares the current position known from the GPS apparatus with the geographical extent described in the execution-conditions in the RFID tag; if the current position falls within the geographical extent described in the execution-conditions in the RFID tag, decision is made that a program specified by the program name is to be selected; otherwise, no program is to be selected. Upon selection of the program by the program selecting means 120, the program executing means 130 activates the selected program for execution.

While in this example, a GPS apparatus is employed as an example of the context acquiring means 150, it is not limited thereto. For example, a clock for acquiring the current time may be employed as the context acquiring means 150, and a time period in which the program should be activated may be written in the execution-conditions to allow activation of a program according to time. Alternatively, a vibration sensor may be employed as the context acquiring means 150, and a range of the amplitude of vibration in which the program should be activated may be written in the execution-conditions to allow activation of a program depending upon an occurrence pattern of vibration.

In a case that there are a plurality of sets of context acquiring means 150, the program selecting means may be configured to acquire data from context acquiring means that provides required data according to a condition described in the execution-conditions read from the RFID tag.

For example, assume that a cell phone includes a GPS apparatus for providing position information and a biometric authentication apparatus for identifying the user of the cell phone as the context acquiring means 150. Moreover, assume that a condition that usage is exclusive to the owner of the cell phone, and a condition relating to the position or extent defined by the latitude/longitude are specified in the RFID tag as the execution-conditions. In this case, the program selecting means 120 acquires biometric authentication information (for example, identification information of the user using fingerprints) from the biometric authentication apparatus, and also acquires information on the latitude/longitude from the GPS apparatus. If usage is made by the owner of the cell phone and the current position falls within the specified latitude/longitude, the specified program is executed.

Furthermore, to identify the current position, there may be provided, as the context acquiring means, a GPS apparatus for providing latitude/longitude, and/or the current position name acquiring apparatus for providing the place-name or address, or the name of a building or a shop.

For example, when a condition in the execution-conditions is specified by the place-name, such as "Ikoma City, Nara Prefecture," the program selecting means 120 acquires the place-name information for the current position from the current position name acquiring apparatus; or alternatively, when a condition in the execution-conditions is specified by latitude/longitude, such as "north of 30 degrees north latitude, east of 130 degrees east longitude," the program selecting means 120 acquires information on latitude/longitude from the GPS apparatus.

Example 3

Now an Example 3 will be described.

Figure 6:
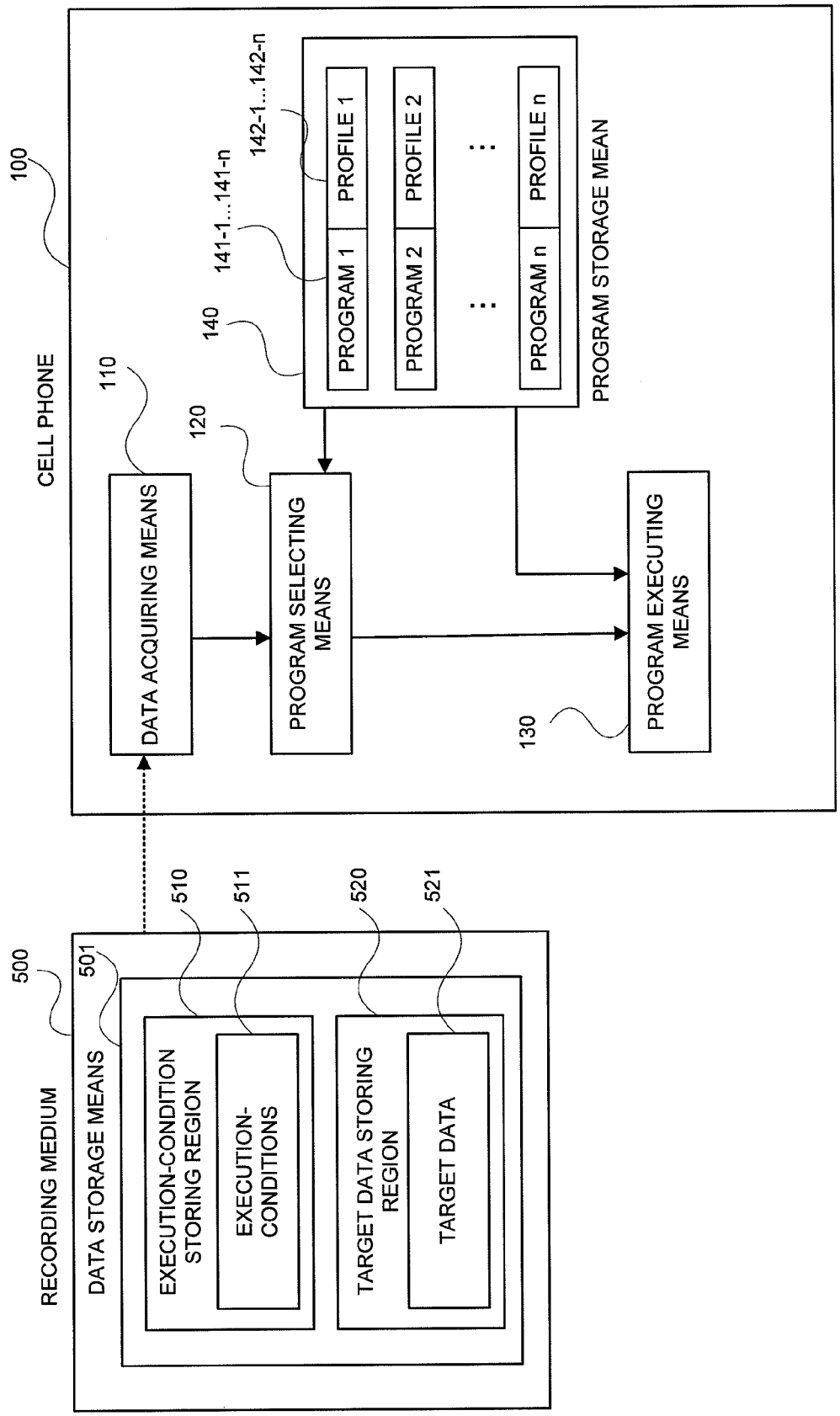
FIG. 6 is a diagram showing a configuration of an Example 3.

Similarly to the Example 1, the Example 3 illustrates a cell phone, which includes a reader for an RFID tag as the data acquiring means 110, stores therein a plurality of application programs, and is capable of executing them. Differences from the Example 1 are in that, as shown in FIG. 6, the program storage means 140 holds therein program profiles 142-1-142-n in which service quality information relating to quality of services provided by individual programs are described corresponding to respective programs; in the execution-conditions written in the RFID tag, service quality required of a program to be activated is described in place of the name of a program; and the program selecting means 120 selects a suitable program by comparing the required service quality with the profile of a program.

For example, the program storage means 140 stores therein a plurality of programs for initiating network connection, and the programs are configured to connect networks with different communication speeds and charges. The communication speed and charge for a network is written into the profile of each program. On the other hand, the RFID tag is written with service quality information corresponding to a communication speed and charge, in place of the name of a specific program.

The program selecting means 120 compares service quality information corresponding to the communication speed and charge described in the RFID with that corresponding to the communication speed and charge described in the profile of the program, and selects a program that satisfies the requirement.

Example 4

Now an Example 4 will be described.

Similarly to the Example 1, the Example 4 illustrates a cell phone, which includes a reader for an RFID tag as the data acquiring means, stores therein a plurality of application programs, and is capable of executing them. Differences from the Example 1 are in that, similarly to the Example 3, the program storage means 120 stores therein a program profile 142 in which property information relating to properties of individual programs are described corresponding to respective programs; in the execution-conditions written in the RFID tag, property information required as a property of a program to be activated is described in place of the name of a program; and the program selecting means 120 selects a suitable program by comparing the information on the required property with the profile of a program.

In the Example 4, it is assumed that first and second programs capable of encrypting data and appending it to an e-mail for transmission to a specified destination are held in the program storage means 140. The first program has a property that encryption can be made with a key of a key length of 64 bits and the second program has a property that encryption can be made with a key of a key length of 128 bits, and their profiles are written with the property of the first program that it has a processible key length of 64 bits, and the property of the second program that it has a processible key length of 128 bits.

On the other hand, the RFID tag is written with property information on the key length in encryption, in place of the name of a specific program.

The program selecting means 120 compares the property information on the key length for a program written in the RFID with that on the handleable key length written in the profile of a program, selects a program that satisfies the requirement.

For example, in a case that the requirement of the key length written in an RFID tag is 128 bit, the second program with a property that it can handle a key length of 128 bits is selected and activated as one that satisfies the requirement.

Example 5

Now an Example 5 will be described.

Similarly to the Example 1 described above, the Example 5 illustrates a cell phone, which includes a reader for an RFID tag as the data acquiring means 110, stores therein a plurality of application programs, and is capable of executing them.

Moreover, similarly to the Example 2, the description will be made on a case in which the execution-conditions include, in addition to the name of a program to be executed, an activation condition for the program, and the program selecting means 120 checks the activation condition to decide validity of activation of a program.

Figure 7:
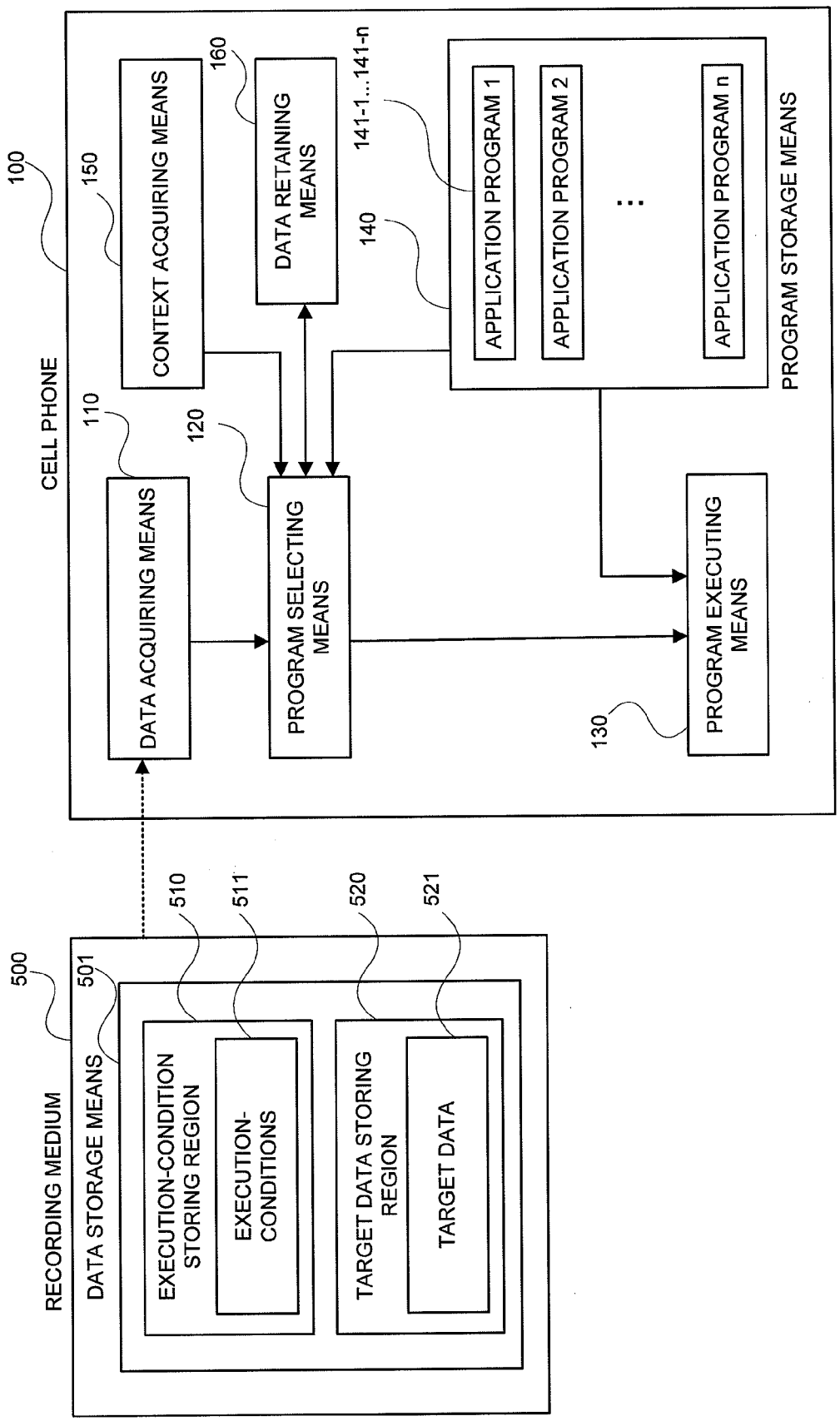
FIG. 7 is a diagram showing a configuration of an Example 5.

The cell phone 100 in the Example 5 additionally includes, as exemplarily shown in FIG. 7, data retaining means 160 for storing data read from an RFID tag, in addition to the components in the examples described above, and if the program selecting means decides that no program that satisfies the condition and can be activated is found when the data is read from the RFID tag, the data is retained in the data retaining means 160, and the program selecting means 120 intermittently checks the data retained in the data retaining means 160, and activates a program as soon as a situation that the condition is satisfied occurs.

For example, a GPS (Global Positioning System) apparatus for determining the current position of the cell phone 100 is employed as the context acquiring means 150, and the name of a program to be executed and a geographical extent in which the program is to be executed are written as the execution-conditions 511 in an RFID tag as the recording medium 500. After the cell phone 100 has read the RFID tag, the program selecting means 120 compares the current position obtained from the GPS apparatus with the geographical extent written as the execution-conditions in the RFID tag; and if the current position does not fall within the geographical extent written as the execution-conditions in the RFID tag, the data read from the RFID is retained in the data retaining means 160. Each time new position data is acquired from the GPS apparatus, the program selecting means 120 compares the position data with the geographical extent of the data retained in the data retaining means 160 as the execution-conditions, and if the position data falls within the extent, a program specified by the name of the program is activated. The target data retained in the data retaining means 160 is then processed, and the target data after the processing and its associated execution-conditions are deleted from the data retaining means 160.

Example 6

Similarly to the Example 1 described above, the Example 6 illustrates a cell phone, which includes a reader for an RFID tag as the data acquiring means 110, stores therein a plurality of application programs, and is capable of executing them. Moreover, similarly to the Example 2, the execution-conditions include, in addition to the name of a program to be executed, an activation condition for the program, and the program selecting means 120 checks the activation condition to decide validity of activation of a program.

Figure 8:
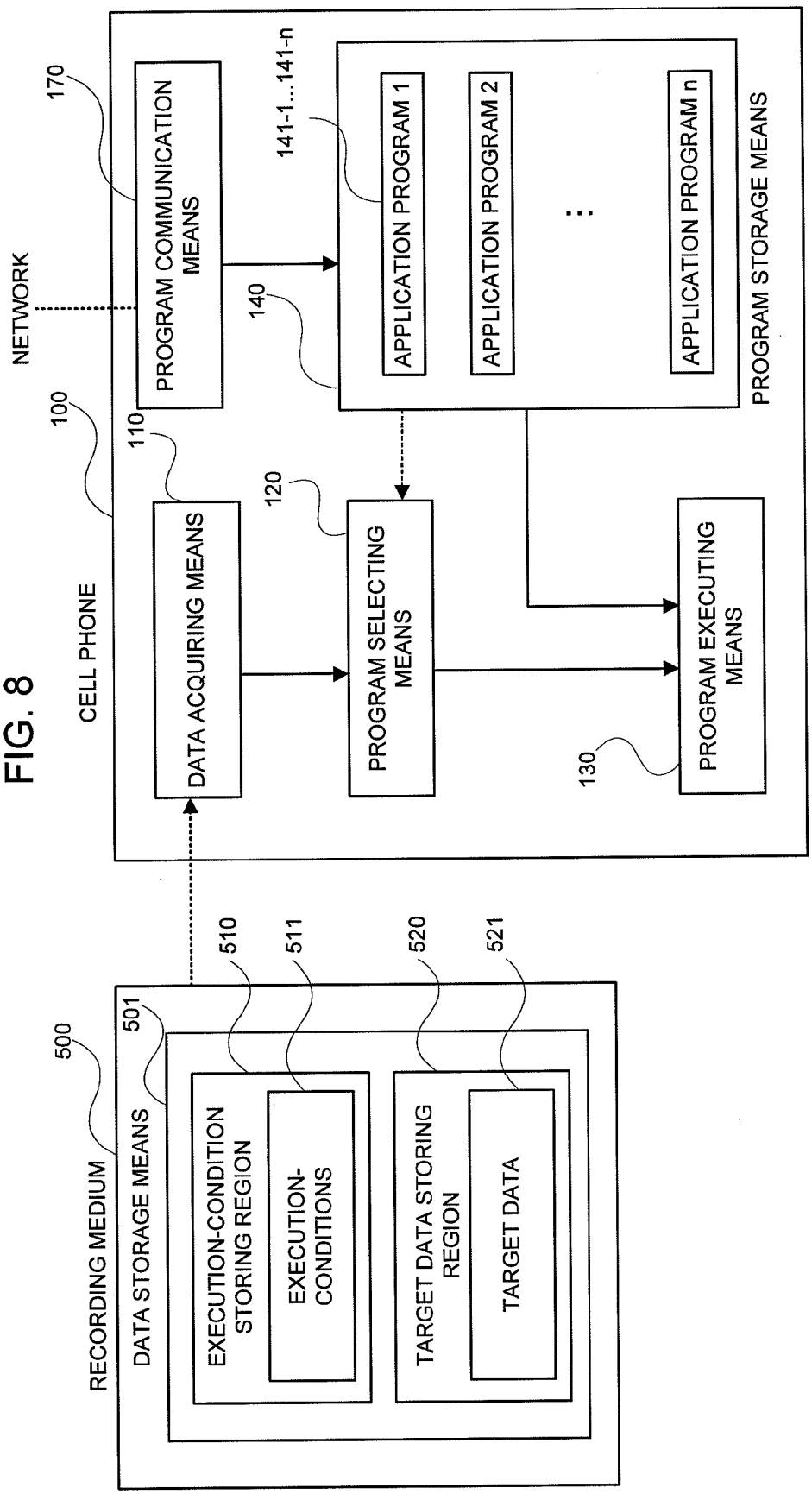
FIG. 8 is a diagram showing a configuration of an Example 6.

A difference of the Example 6 from the examples described above is in that it further includes program communication means 170, as shown in FIG. 8, for making communication with an external network to acquire a program and storing it in the program storage means 140; and if the program selecting means 120 decides that any program that matches the name of the program read from the execution-condition storing region 510 in the RFID tag is not found, a program that matches the read name of the program is acquired by the program communication means 170 for execution.

For example, if the program selecting means 120 decides that any program that matches the name of the program read from the execution-condition storing region in the RFID tag is not found, the program communication means 170 comprising a data communication apparatus in the cell phone connects to the Internet, searches the Internet for a program that matches the name of the program, and downloads it. As soon as the program becomes ready to be executed, that is, for example, downloading has been completed, the program selecting means 120 selects the program, and the program executing means 130 executes the downloaded program.

It should be noted that while expression "activating a program" or the like is sometimes used in the examples described above, if the program is already active, the program selecting means 120 need not newly select the program, and it may pass the target data to the active program for processing.

Example 7

Now an Example 7 will be described.
Similarly to the Example 1, the Example 7 includes, in a cell phone that stores therein a plurality of application programs and is capable of executing them, a bar code reader as the data acquiring means 110.

This example uses a two-dimensional QR code as bar code, and a bar code reader adapted for the QR code employing a camera function supported by a cell phone. The recording medium 500 is a printed matter printed with a two-dimensional QR code in which program execution-conditions 511 and target data 521 are encoded.

Specifically, a dealer distributes a coupon 600 as shown in FIG. 9. The coupon 600 is printed thereon with a QR code 550 serving as a recording medium 500. The QR code on the coupon 600 exemplarily shown in FIG. 9 is recorded with "My Device¥Program Files¥Shop1Appli" for the name (identification information) of the application program to be executed as the execution-conditions 511, as shown in FIG. 10. Instead of, or in addition to, the name (identification information) of the application program, other execution-conditions such as application program property information, service quality information, or application program activation condition information, may be incorporated in the program execution-conditions.

For the target data 521, data "DiscountCoupon(500, JPY)," which is interpreted by the application program as a 500-yen discount is recorded.

In addition to the execution-conditions 511 and target data 521, the QR code may further store therein supplementary information, such as processing specification information 531 for instructing the specified program how to process the target data. The QR code in FIG. 9 in which the information shown in FIG. 10 is encoded has an execution-condition storing region 510 composed by a region in which the identification information 511 for an application program is encoded following "T:", and a target data storing region 520 composed by a region in which the target data 521 and processing specification information 531 are encoded following "D:".

On the other hand, it is assumed that a user's cell phone stores therein an application program distributed by the dealer and identified by the name (identification information) of the application program "My Device¥Program Files¥Shop1Appli."

Once the QR code printed on the coupon is read by the data acquiring means 110 in the cell phone, an application program for processing the coupon identified by the execution-conditions 511, "My Device¥Program Files¥Shop1Appli," is activated, and a 500-yen discount recorded as the target data 521 is made redeemable.

Example 8

An Example 8 is a more concrete version of the aforementioned examples, and particularly, the execution-conditions 511 and target data 521 recorded on the recording medium 500 are specified in more detail. This example assumes an RFID tag as an example of the recording medium 500.

FIG. 11 shows a configuration of one record recorded with information such as execution-conditions 511 and target data 521 on the RFID tag.

As shown in FIG. 11, Control record (record name: "Gc") is an outer frame of the whole data held in the recording medium 500, within which Target record (record name: "t" or "target"), Action record (record name: "a," "action"), and Data record (record name: "d," "data") are written. Specifically, Target record is a record written with application program identification information as the execution-conditions 511 in the aforementioned example, Action record is a record written with execution-conditions 511 other than the application program identification information, and Data record is a record written with the target data 521.

FIG. 12 is an example of a table written in Control record when a 500-point bonus is given to a customer via a recording medium. In the example shown in FIG. 12, information written in Target record, i.e., application program identification information, is "localhost://App/CustomerBonus," Action record is written with "add," and Data record is written with "500." This causes a terminal that has received these information to be given 500 "add"ed points by an application program identified by "localhost://App/CustomerBonus."

Example 9

An Example 9 is another concrete example employing the record structure as described above in the Example 8.

FIG. 13 shows an example of a table written in Control record when a cell phone is transitioned to a silent mode or a "manner mode." In the example shown in FIG. 13, information written in Target record is "PropertyManager," Action record is written with "set," and Data record is written with "on." This causes a terminal that has received these information to transition to a silent mode or a "manner mode" (i.e., such a mode is turned "on").

Example 10

An Example 10 a still another concrete example employing the record structure as described above in the Example 8.

FIG. 14 shows an example of a table written in Control record when a plurality of records are used to cause a terminal or the like to do two or more kinds of actions. In the example shown in FIG. 14, a first record is written with information for turning off the silent mode of a cell phone, and a second record is written with information for acquiring music data from a location identified by a URI for reproduction on a music player. This causes a terminal that has received these information to turn its silent mode off, and reproduce music using the acquired music data. In a case that a condition written in the first record is not enabled, such as a case that the cell phone is not in the silent mode, the operation written in the second record is not effected.

The present application claims priority based on Japanese Patent Application No. 2006-133755 filed on May 12, 2006, disclosure of which is incorporated herein in its entirety.

The invention claimed is:

1. An information processing system, comprising:
a recording medium having an execution-condition recording region for recording execution-conditions under which an application program that an information processing terminal includes is executed, wherein the execution-conditions for the application program include application program identification information for identifying the application program, application program property information for specifying a property of the application program, service quality information for specifying quality of a service required of the application program to be activated and application program activation condition information for an activation condition for the application program, which activation condition relates to at least geographical extent and a range of an amplitude of vibration; and
an information processing terminal including program storage means for storing therein application programs previously, acquiring means for acquiring the execution-conditions for the application program from said recording medium, context acquiring means for acquiring at least information of a current position based on a Global Positioning System (GPS) and the amplitude of vibration, application program selecting means for determining whether or not the activation condition that the execution-conditions acquired by said acquiring means specify is satisfied based on at least information of the current position and the amplitude of vibration acquired by said context acquiring means, and selecting an application program out of said application programs stored previously in said program storage means when it is determined that the activation condition is satisfied, and application program executing means for executing the application program selected by said application program selecting means.

2. An information processing system according to claim 1, wherein the system is configured so that:
said recording medium includes a data recording region in which data to be processed by an application program is recorded;
said acquiring means acquires the execution-conditions for said application program and the data from said recording medium; and
said application program executing means processes the data acquired by said acquiring means by means of the application program selected by said application program selecting means.

3. An information processing system according to claim 1 or claim 2, wherein:
the execution-conditions for said application program have application program identification information for identifying an application program to be executed by said application program executing means; and
said application program selecting means selects an application program corresponding to the application program identification information acquired by said acquiring means.

4. An information processing system according to claim 1 or claim 2, wherein:
the execution-conditions for said application program have application program property information for specifying a property of the application program to be executed by said application program executing means; and
said application program selecting means stores therein property information for at least one application program, and selects an application program corresponding to the application program property information acquired by said acquiring means based on said stored property information for the application program.

5. An information processing system according to claim 1 or claim 2, wherein:
the execution-conditions for said application program have service quality information for specifying quality of a service provided by the application program to be executed by said application program executing means; and said application program selecting means stores therein service quality information provided by at least one application program, and selects an application program corresponding to the service quality information acquired by said acquiring means based on said stored service quality information.

6. An information processing system according to any of claim 1 to claim 2, wherein:

the system comprises program communication means for acquiring an application program from an outside; and said application program selecting means acquires an application program suited to the execution-conditions for an application program acquired by said acquiring means via said program communication means.

7. An information processing system according to any of claim 1 to claim 2, wherein said recording medium is a non-contacted IC card.

8. An information processing system according to any of claim 1 to claim 2, wherein said recording medium is a paper medium printed with a bar code.

9. An information processing system according to claim 1, wherein:

said application program selecting means compares the current position based on GPS acquired by said context acquiring means with the geographical extent that the execution-conditions specify, and determines that the activation condition is satisfied when the current position falls within the geographical extent.

10. An information processing system according to claim 1, wherein:

said application program selecting means compares the amplitude of vibration acquired by said context acquiring means with the range of the amplitude of vibration that the execution-conditions specify, and determines that the activation condition is satisfied when the amplitude of vibration falls within the range of the amplitude of vibration.

11. An information processing method comprising:

storing application programs in an information processing terminal previously;

recording execution-conditions under which an application program that an information processing terminal includes is executed on a recording medium, wherein the execution-conditions for the application program include application program identification information for identifying the application program, application program property information for specifying a property of the application program, service quality information for specifying quality of a service required of the application program to be activated and application program activation condition information for an activation condition for the application program, which activation condition relates to at least a geographical extent and a range of an amplitude of vibration;

in an information processing terminal, acquiring the execution-conditions for the application program from said recording medium;

acquiring at least information of a current position based on a Global Positioning System (GPS) and the amplitude of the vibration;

determining whether or not the activation condition that the acquired execution-conditions specify is satisfied based on the acquired at least the information of the current position and the amplitude of vibration;

selecting an application program out of said application programs stored previously in said information processing terminal when it is determined that the activation condition is satisfied; and executing said selected application program in said information processing terminal.

12. An information processing method according to claim 11, wherein:

the execution-conditions for the application program and data to be processed by said application program are recorded on a recording medium;

an information processing terminal acquires the execution-conditions for said application program and the data from said recording medium;

said information processing terminal selects an application program suited to said acquired execution-conditions for the application program; and said information processing terminal processes said acquired data by executing said selected application program.

13. An information processing method according to claim 11 or claim 12, wherein:

the execution-conditions for said application program recorded on said recording medium have application program identification information for identifying an application program to be executed by said information processing terminal; and said information processing terminal selects an application program corresponding to said acquired application program identification information.

14. An information processing method according to claim 11 or claim 12, wherein:

the execution-conditions for said application program recorded on said recording medium have application program property information for identifying a property of an application program to be executed by said information processing terminal; and said information processing terminal stores therein property information for at least one application program, and selects an application program corresponding to said acquired application program property information based on said stored property information for the application program.

15. An information processing method according to claim 11 or claim 12, wherein:

the execution-conditions for said application program recorded on said recording medium have service quality information for specifying quality of a service provided by the application program to be executed by said information processing terminal; and said information processing terminal stores therein service quality information provided by at least one application program, and selects an application program corresponding to said acquired service quality information based on said stored service quality information.

16. An information processing method according to any of claim 11 to claim 12, wherein:

said information processing terminal acquires an application program suited to said acquired execution-conditions for the application program via communication.

17. An information processing method according to claim 11, wherein:

said information processing terminal compares the current position based on GPS with the geographical extent that the execution-conditions specify, and determines that the activation condition is satisfied when the current position falls within the geographical extent.

18. An information processing method according to claim 11, wherein:
said information processing terminal compares the amplitude of vibration with the range of the amplitude of vibration that the execution-conditions specify, and determines that the activation condition is satisfied when the amplitude of vibration falls within the range of the amplitude of vibration.

19. An information processing terminal, comprising:
program storage means for storing therein application programs previously;
acquiring means for acquiring, from a recording medium recorded with data and execution-conditions under which an application program for processing said data that said information processing terminal includes is executed, said data and the execution-conditions for said application program stored previously in said information processing terminal, wherein the execution-conditions for the application program include application program identification information for identifying the application program, application program property information for specifying a property of the application program, service quality information for specifying quality of a service required of the application program to be activated and application program activation condition information for an activation condition for the application program, which activation condition relates to at least a geographical extent and a range of an amplitude of vibration;
context acquiring means for acquiring at least information of a current position based on a Global Positioning System (GPS) and the amplitude of vibration;
application program selecting means for determining whether or not the activation condition that the execution-conditions acquired by said acquiring means specify is satisfied based on at least the information of the current position and the amplitude of vibration acquired by said context acquiring means, and selecting an application program out of said application programs stored previously in said program storage means when it is determined that the activation condition is satisfied; and
application program executing means for processing the data acquired by said acquiring means by means of the application program selected by said application program selecting means.

20. A non-transitory recording medium recorded with a program, wherein said program causes an information processing terminal to execute the processing of:
acquiring, from a recording medium recorded with execution-conditions under which an application program that said information processing terminal includes is executed and data to be processed by said application program, the execution-conditions for said application program stored previously in said information processing terminal and the data, wherein the execution-conditions for the application program include application program identification information for identifying the application program, application program property information for specifying a property of the application program, service quality information for specifying quality of a service required of the application program to be activated and application program activation condition information for an activation condition for the application program, which activation condition relates to at least the a geographical extent and a range of an amplitude of vibration;
determining whether or not the activation condition that the acquired execution-conditions specify is satisfied based on at least the information of a current position based on a Global Positioning System (GPS) and the amplitude of vibration;
selecting an application program out of application programs stored previously in said information processing terminal when it is determined that the activation condition is satisfied; and
processing said acquired data by said selected application program.

21. An information processing system, comprising:
a recording medium having an execution-condition recording region for recording execution-conditions for an application program, wherein the execution-conditions for the application program include application program identification information for identifying the application program, application program property information for specifying a property of the application program, service quality information for specifying quality of a service including at least communication speeds and charges required of a program to be activated, and application program activation condition information for specifying an activation condition for the application program; and
an information processing terminal including program storage means for storing previously therein application programs configured to connect networks with different communication speeds and charges, and holding service quality information relating to the quality of the service including at least the communication speeds and charges provided by each said application program corresponding to respective programs, acquiring means for acquiring the execution-conditions for the application program from said recording medium, application program selecting means for selecting the service quality information including at least the communication speeds and charges suited to the execution-conditions specifying quality of the service including at least the communication speeds and charges acquired by said acquiring means from said program storage means and selecting the application program out of said application programs stored previously in said program storage means corresponding to the selected service quality information, and application program executing means for executing the application program selected by said application program selecting means.

22. An information processing method comprising:
recording execution-conditions for an application program on a recording medium, wherein the execution-conditions for the application program include application program identification information for identifying the application program, application program property information for specifying a property of the application program, service quality information for specifying quality of a service including at least communication speeds and charges required of a program to be activated, and application program activation condition information for specifying an activation condition for the application program;
storing application programs configured to connect networks with different communication speeds and charges, and holding service quality information relating to the quality of the service including at least the communication speeds and charges provided by each said application program corresponding to respective programs in an information processing terminal;

acquiring the execution-conditions for the application program from said recording medium;

selecting the service quality information including at least the communication speeds and charges in the information processing terminal, suited to the acquired execution-conditions specifying quality of the service including at least the communication speeds and charges;

selecting the application program out of said application programs stored previously in the information processing terminal corresponding to the selected service quality information; and executing the selected application program in the information processing terminal.

* * * * *